United States Patent
Bharara et al.

(10) Patent No.: US 11,409,605 B2
(45) Date of Patent: Aug. 9, 2022

(54) FAILOVER SYSTEM FOR DATABASE UNAVAILABILITY

(71) Applicant: SAP SE, Walldorf (DE)

(72) Inventors: Aavishkar Bharara, Bangalore (IN); Ankita Prabhu, Kumta (IN); Bhavneet Kaur, Ludhiana (IN)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 17/074,904

(22) Filed: Oct. 20, 2020

(65) Prior Publication Data

US 2022/0121519 A1    Apr. 21, 2022

(51) Int. Cl.
| | | |
|---|---|---|
| *G06F 11/00* | (2006.01) | |
| *G06F 11/14* | (2006.01) | |
| *G06F 11/20* | (2006.01) | |

(52) U.S. Cl.
CPC ........ *G06F 11/142* (2013.01); *G06F 11/2094* (2013.01); *G06F 2201/80* (2013.01); *G06F 2201/82* (2013.01)

(58) Field of Classification Search
CPC ............... G06F 11/079; G06F 11/0709; G06F 11/0751; G06F 11/0793; G06F 11/142; G06F 11/1658; G06F 11/202–2053; G06F 11/2082; G06F 11/2094; G06F 16/23; G06F 16/252; G06F 16/256; G06F 16/27; G06F 2201/80

See application file for complete search history.

(56) References Cited

U.S. PATENT DOCUMENTS

| | | |
|---|---|---|
| 7,346,633 B2 | 3/2008 | Shang et al. |
| 8,521,695 B2 | 8/2013 | Zwilling et al. |
| 8,880,480 B2 | 11/2014 | Kundu et al. |
| 9,251,011 B2 | 2/2016 | Meier et al. |
| 9,733,862 B1 | 8/2017 | Klemm et al. |
| 9,760,617 B2 | 9/2017 | Shang et al. |
| 10,210,055 B2 | 2/2019 | Zhu |
| 2007/0198524 A1* | 8/2007 | Branda ............... H04L 67/1034 |
| 2011/0145210 A1 | 6/2011 | Rathinam et al. |
| 2013/0297566 A1 | 11/2013 | Colrain et al. |

(Continued)

FOREIGN PATENT DOCUMENTS

| | | | | |
|---|---|---|---|---|
| EP | 2270689 A1 * | 1/2011 | ....... | G06F 17/30548 |
| WO | WO-2004031897 A2 * | 4/2004 | ....... | G06F 17/30575 |
| WO | 2016078529 A1 | 5/2016 | | |

*Primary Examiner* — Michael Maskulinski
(74) *Attorney, Agent, or Firm* — Buckley, Maschoff & Talwalkar LLC

(57) ABSTRACT

Systems and methods include receiving an exception raised by a database storage system in response to a database operation requested by an application, providing, in response to the exception, the application with a pointer to a failover framework comprising a memory store, receiving, from the application and at the failover framework, a request to write first data, storing, in response to the request to write first data, the first data in a tree structure of the memory store in chronological order, receiving, from the application and at the failover framework, a request to read second data, and, in response to the request to read second data, sorting the tree structure primarily by user and secondarily by chronological order and reading the second data from the sorted tree structure.

18 Claims, 9 Drawing Sheets

(56) References Cited

U.S. PATENT DOCUMENTS

| | | | |
|---|---|---|---|
| 2014/0006356 A1* | 1/2014 | Held | G06F 16/284 |
| | | | 707/667 |
| 2018/0246928 A1 | 8/2018 | Kim et al. | |
| 2019/0294512 A1 | 9/2019 | Chen et al. | |
| 2020/0012726 A1* | 1/2020 | Cohen | G06F 16/245 |
| 2021/0026825 A1* | 1/2021 | Gupta | G06F 9/546 |

* cited by examiner

FAILOVER SYSTEM FOR DATABASE UNAVAILABILITY

BACKGROUND

Modern software architectures use database systems to provide low-latency structured data storage. In one example, a user interacts with a software application to access data stored within a database system. In response, the software application instructs the database system to create, read, update and/or delete the data. The software application and/or the database system may be implemented on-premise or in the cloud.

The software application may be unable to perform its desired functions if the database system crashes or is otherwise unavailable. In such a case, the software application may present the user with an error message (e.g. "System not responding, please retry.") or may simply pause until the database system becomes available. Either scenario is inefficient for the user, and may reduce the user's confidence in and satisfaction with the software application.

A software application might be customized to cope with database unavailability. This customization is challenging, at least because an application developer is typically not familiar with storage-related concepts. Moreover, it would be inefficient to independently customize each user-desired software application in this manner.

An efficient framework for providing data services to an application in the event of database unavailability is desired. Such a framework may preferably be transparent to a user of the application, as well as to a developer of the application.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments provide a runtime database error handling mechanism for applications. According to some embodiments, an alternate data store is created and used by an application in a case that a primary database is unavailable. Upon resolution of the error condition, the contents of the alternate data store are merged into the primary database and the next-received read operation is handled by the primary database.

The use of the alternate data store may be transparent to a user of the application. That is, from the user's perspective, the application behaves in the same manner whether or not the database system is operational (in which case reads are serviced by the database system) or in an error state (in which case reads are serviced by the alternate data store).

The use of the alternate data store may also be transparent to the application. In other words, the application is not aware as to whether its CRUD operations are being handled by the database system or whether the database system is down and the CRUD operations are being handled by the alternate data store. Accordingly, a developer may code the application without any consideration of the alternate data store.

In some examples, an application may include functionality for handling database unavailability errors. This functionality may be used for error handling if the application is deployed without a framework as presented herein. If the application is deployed in conjunction with a framework as described herein, and a database unavailability error arises, the application is not notified of the error and may therefore continue normal execution without invoking its own error handling.

Figure 1:
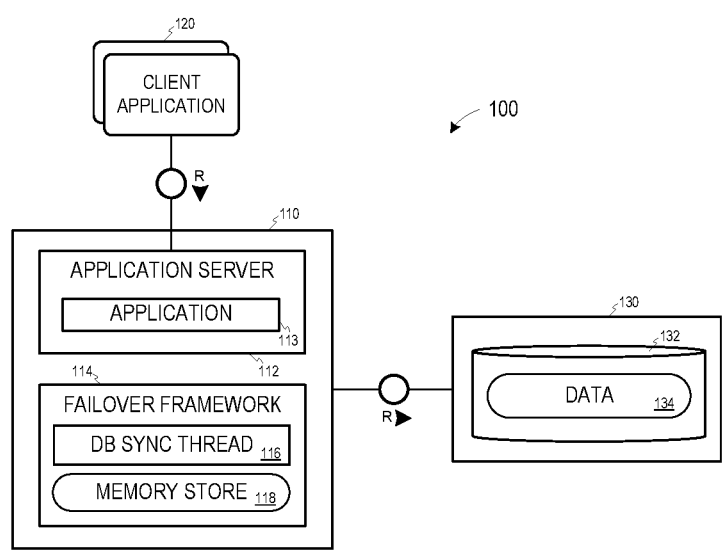
FIG. 1 is a block diagram of a three-tier architecture including an application platform having a failover framework according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Generally, platform 110 receives queries from client applications 120 and returns results thereto based on data 134 stored within storage system 132 of database system 130. Database system 130 may implement any database technology that is or becomes known, and storage system 132 may comprise any combination of volatile memory (e.g., Random Access Memory (RAM)) and non-volatile memory (e.g., fixed disk, Flash memory, non-volatile (RAM)).

Platform 110 executes program code to provide application server 112. Application server 112 provides services for executing server applications such as application 113. For example, a Web application executing on application server 112 may receive HyperText Transfer Protocol (HTTP) requests from client applications 120 and return data 134 from storage 132 in response thereto. Client applications 120 may, for example, comprise front-end Web applications downloaded from application server 110 and executing within a Web browser of a user device.

Failover framework 114 may operate as described herein to execute CRUD operations issued by application 113 in response to an error raised by database system 130. Failover framework 114 may further operate to detect such an error condition. Once database system 130 becomes available, failover framework 114 operates to merge data changes which occurred during the downtime with data 134.

More specifically, database synchronization thread 116 of failover framework 114 may operate to receive an exception from database system 130 in response to a CRUD operation initiated by application 113. Database system 130 may throw such an exception, for example, if it is unable to service the operation. The exception is not passed to application 113, which therefore continues to operate as before. Rather, database synchronization thread 116 operates to execute the current operation and continues to receive and execute CRUD operations until database system 130 returns to an operational state. According to some embodiments, a user of client application 120 continues to interact with application 113 during the above sequence without any interruption in functionality.

Database synchronization thread 116 executes CRUD operations with respect to memory store 118. Memory store 118 may store a linked list, tree, or other data structure used to service CRUD operations during unavailability of database system 130. According to some embodiments, the data structure of memory store 118 is populated during normal operation of database server 130 (i.e., prior to unavailability of database server 130) such that the data structure is populated with recent data at the time at which an exception is raised by database system 130.

As will be described in detail below, database synchronization thread 116 may store user actions in a flexible tree structure which is manipulated in different ways in response to different CRUD operations. For example, a user interaction received by application 113 may cause database synchronization thread 116 to create a business object and a corresponding technical object in memory store 118, in which technical objects corresponding to different business objects are not linked. When reading from memory store 118, the objects therein are rearranged by timestamp, the technical objects are linked, and desired data is read by traversing a path through various technical objects.

Data 134 of database system 130 may comprise one or more of conventional tabular data, row-based data, column-based data, and object-based data. Data 134 may also include metadata describing the structure and characteristics of data stored in storage 132 as is known in the art. Database system 130 may support multi-tenancy to separately support multiple unrelated clients by providing multiple logical database systems which are programmatically isolated from one another.

Database system 130 may implement an "in-memory" database, in which a full database stored in volatile (e.g., non-disk-based) memory. The full database may be persisted in and/or backed up to fixed disks (not shown). Embodiments are not limited to an in-memory implementation. For example, data may be stored in RAM (e.g., cache memory for storing recently-used data) and one or more fixed disks (e.g., persistent memory for storing their respective portions of the full database).

Figure 2:
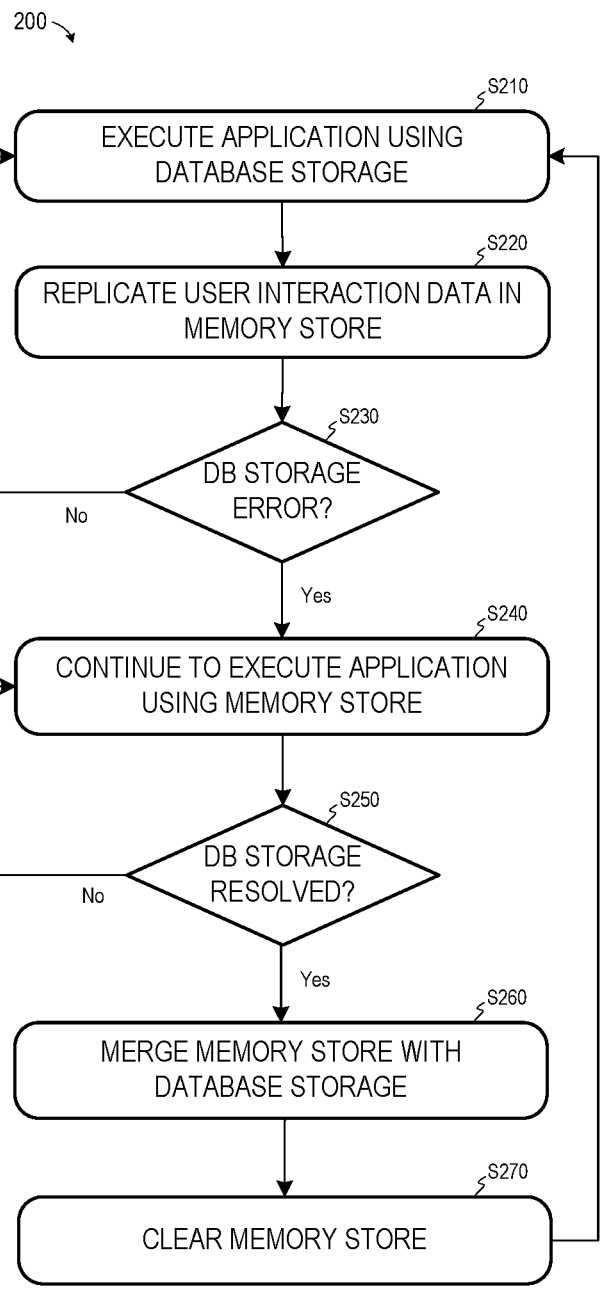
FIG. 2 is a flow diagram of a process to handle database storage errors according to some embodiments.

FIG. 2 comprises a flow diagram of process 200 according to some embodiments. Process 200 will be described with respect to the elements of system 100, but embodiments are not limited thereto.

Process 200 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an application is executed using database storage. The application may comprise a "middleware" application such as a server application executing on an application server of a platform such as platform 110. A server application executing at S210 may communicate with a front-end application, such as an application executing within a virtual machine of a Web browser executing on a user computing system. Embodiments are not limited to such a server application.

During execution at S210, the application reads from and writes to data stored in database storage of a database system such as database system 130 of FIG. 1. The database storage may comprise one or more cloud storage services, may be provided by a same platform as used to execute the application server, or may be implemented in any other manner.

User interaction data resulting from execution of the application at S210 is replicated in a memory store at S220. According to some embodiments, the user interaction data comprises data which is passed between the front-end application and the server application during execution of the server application, and semantic information describing the data. The data and semantic information may be formatted as object instances as is known in the art. As will be described in detail below, the memory store may store the object instances in a chronological tree format.

Figure 3:
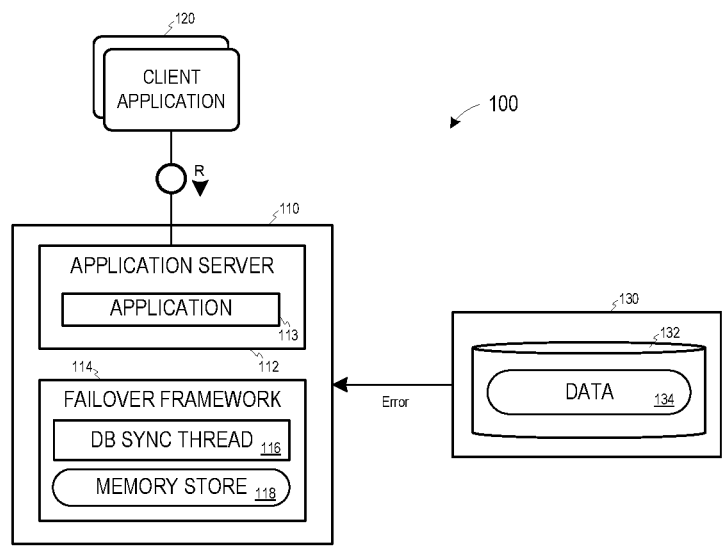
FIG. 3 is a block diagram illustrating a database storage error according to some embodiments.

Flow then proceeds to S230 and, if no database storage error has been raised, flow returns to S210 and S220 to continue execution as described above. Accordingly, the application executes and the user interaction data is replicated until a database storage error is detected at S230. FIG. 3 illustrates system 100 of FIG. 1, showing transmission of an indication of an error condition from database system 130 to application server 120 at S230 according to some embodiments.

The database storage error may comprise an exception in a case that the database system has not yet initialized. For example, in a case that the database system crashes before a database connection pointer is established, the database connection pointer would return the error condition itself. According to some embodiments, the error condition is returned to framework 114 rather than to application 113, and, in response, framework 114 returns a virtual database pointer representing framework 114 to application 113. Accordingly, application 113 is unaware of the error and treats framework 114 as its database storage system.

In another example of S230, the database system crashes after the database connection pointer has been established. The database storage error may comprise an indication that the current the database connection pointer is invalid. Rather than being returned to application 113, the error is returned to framework 114, which provides a new database connection pointer to application 113. Again, application 113 is unaware of the error and beings to treats framework 114 as its database storage system.

Figure 4:
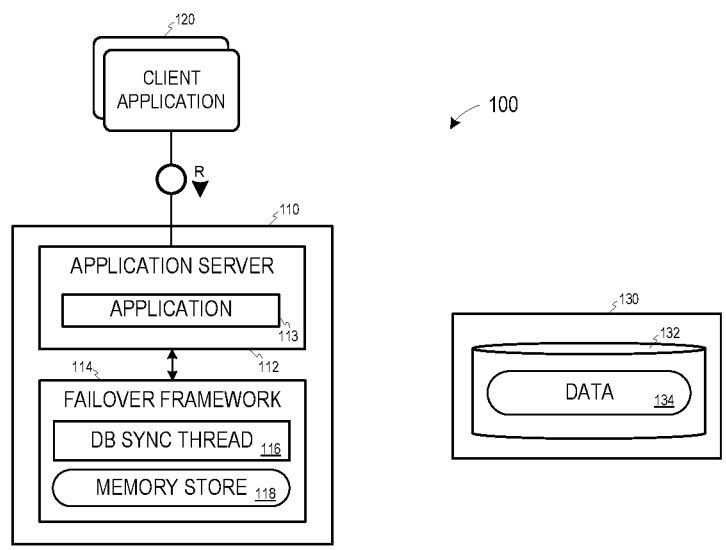
FIG. 4 is a block diagram illustrating usage of a memory store for create, read, update and delete (CRUD) operations according to some embodiments.
Figure 5:
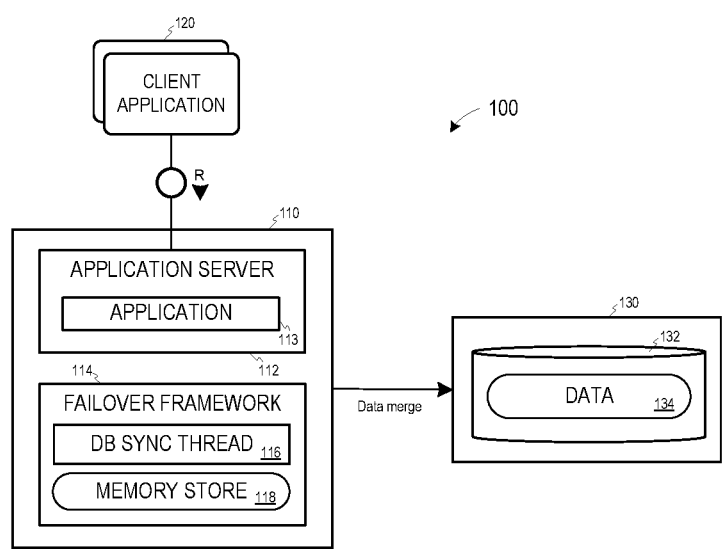
FIG. 5 is a block diagram illustrating merging of a memory store with database data according to some embodiments.

Accordingly, once an error is detected at S230, flow proceeds to S240 to continue to execute the application using a memory store for CRUD operations as described herein. FIG. 4 illustrates communication between application server 112 and framework 114 during execution of application 113 at S240 according to some embodiments. During such execution, data may be stored in and read from memory store 118 in a manner which is transparent to the user and to application 113.

Figure 6:
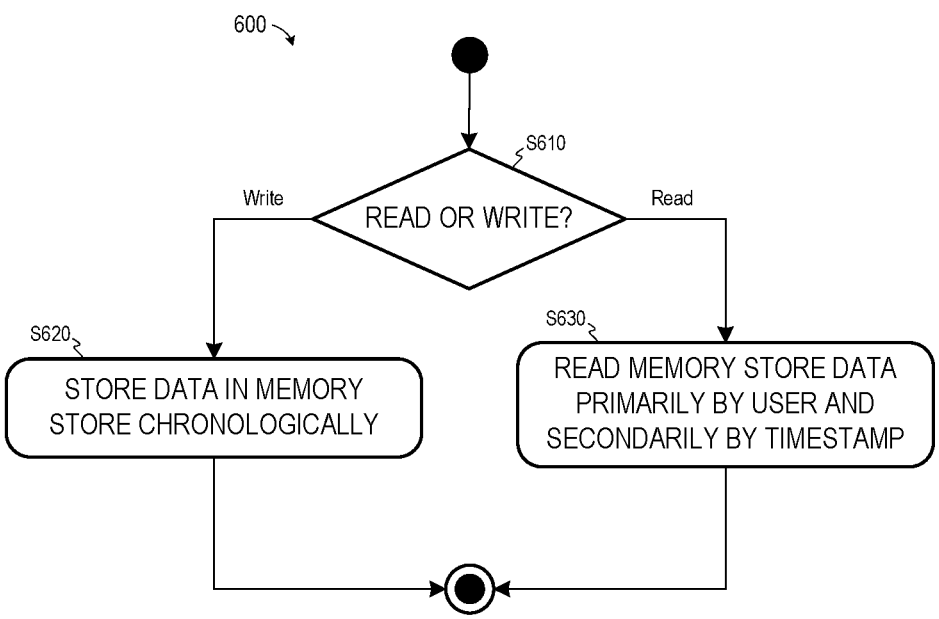
FIG. 6 is a flow diagram of a process to handle read and write operations to a memory store according to some embodiments.

The application continues to execute using the memory store at S240 until it is determined at S250 that the database storage error is resolved and the database system is available to service CRUD operations. After such a determination, flow proceeds to S260 to merge the current memory store with application data stored in the database storage. The merge is intended to bring the database storage up-to-date with respect to transactions which may have occurred during execution of the application at S240. FIG. 6 illustrates transmission of memory store 118 for merging with data 134 according to some embodiments of S240. Further details of the data merge at S260 are provided below.

The memory store is cleared at S270 and flow then returns to S210. Prior to returning to S210, the database connection pointer is updated to reflect the now-available database storage.

FIG. 6 shows process steps 600 for handling read and write operations using a memory store at S240 according to some embodiments. Process steps 600 may be performed by database synchronization thread 116 of framework 114 according to some embodiments. Database synchronization thread 116 may also execute the data merge at S260 according to some embodiments.

It will be assumed that, during S240, framework 114 receives an operation to write data from application 113 at S610. Flow therefore proceeds to S620. At S620, the data is stored chronologically in memory store 118.

Figure 7:
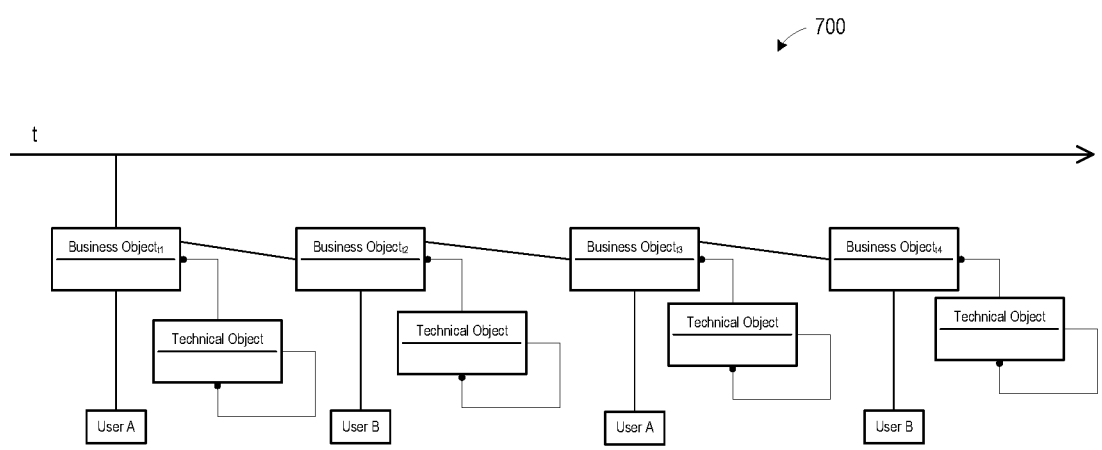
FIG. 7 illustrates storage of data in a memory store according to some embodiments.

FIG. 7 illustrates storage of data in a memory store 700 according to some embodiments. The data is stored as object instances associated with a given user.

More particularly, each user interaction may be stored in memory store 700 as a business object instance associated with one or more technical object instances. The technical object instances store the data of the user interaction and the associated business object stores data semantics such as, but not limited to, data types and data variable positions in a corresponding API call.

Memory store 700 stores the object instances as a tree of linked nodes ordered chronologically. Each user interaction represented by a business object and one or more technical objects is associated with a timestamp representing a time t at which the object instance was stored, a user executing the corresponding CRUD command, and the CRUD command type. By storing the data chronologically, memory store 700 supports efficient addition of new nodes. That is, the new nodes representing a new user interaction (regardless of the user's identity) may simply be appended to an end of the tree.

Figure 8:
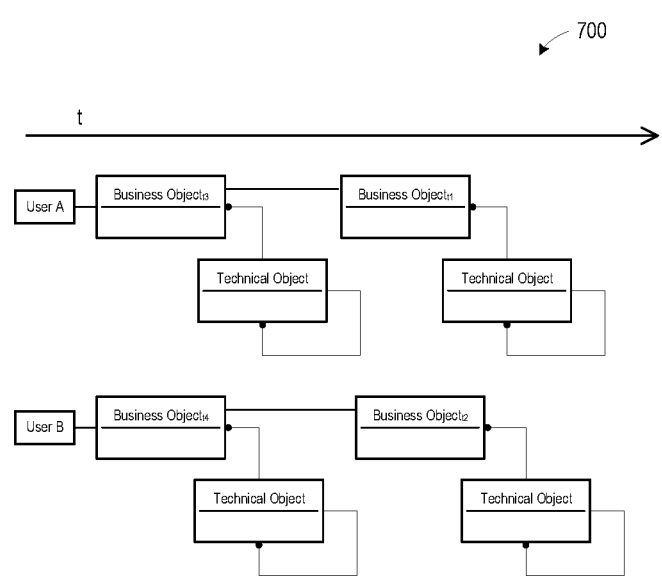
FIG. 8 illustrates reading of data from a memory store according to some embodiments.

S630 is executed if a read operation is received at S610. At S630, the memory store is sorted primarily by user, secondarily by time series (e.g., in reverse-chronological order) and then read. FIG. 8 illustrates sorting of memory store 700 for reading data therefrom at S630.

As shown in FIG. 8, the two user interactions associated with user A are sorted together and arranged reverse-chronologically. Similarly, the two user interactions associated with user B are sorted together and arranged reverse-chronologically. Accordingly, a user interaction associated with user A may be read without traversing any of the user interactions associated with user B. That is, the search for desired data may quickly be narrowed to only data associated with user A and then further refined based on timestamp. Assuming that more-recent data is of greater relevance than less-recent data, the reverse-chronological ordering further facilitates fast retrieval of desired data.

Figure 9:
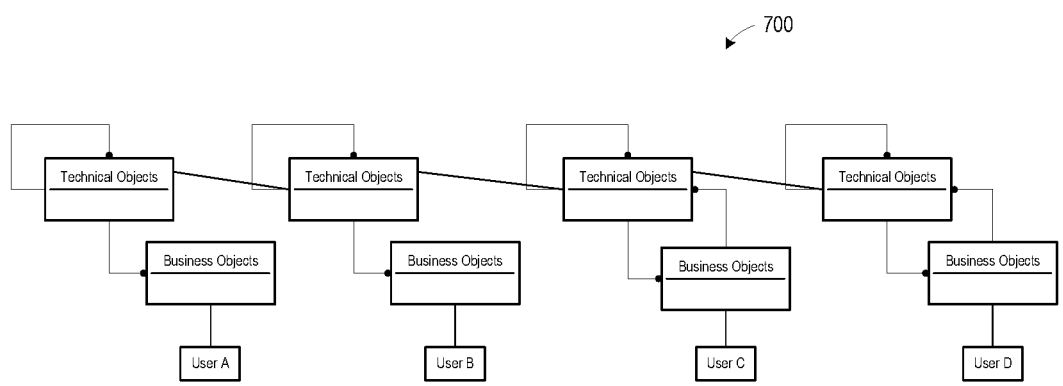
FIG. 9 illustrates merging of data from a memory store with database data according to some embodiments.

FIG. 9 illustrates another arrangement of memory store 700 which occurs prior to merging memory store data with database data at S260. The FIG. 9 arrangement provides a view based on technical object instances and sorted by user, thereby facilitating merger with the database data. In more detail, the FIG. 9 arrangement allows efficient collection of all technical objects associated with user interactions of each user, for merging with stored data associated with each user in the database storage system. Moreover, the technical object instances may be stored in a standard object notation, such as JavaScript Object Notation, enabling interoperability with many types of database storage systems.

Figure 10:
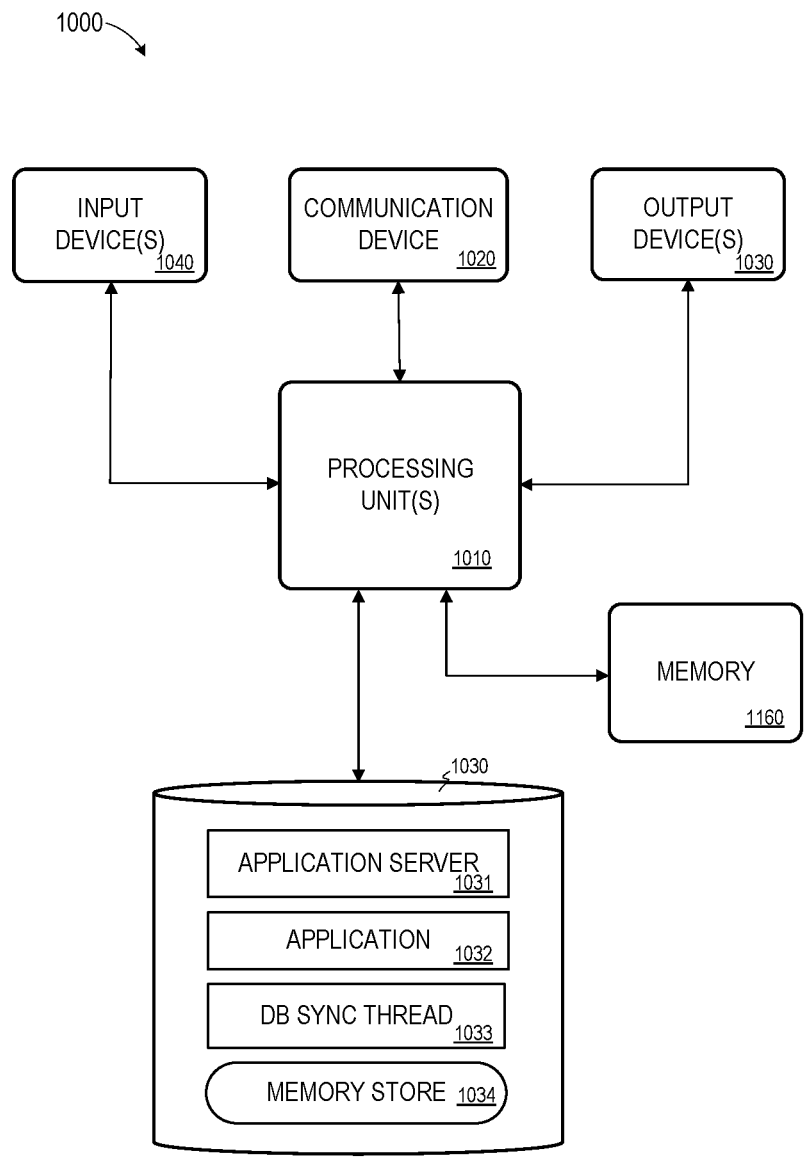
FIG. 10 is a block diagram of a computing system providing an application platform.

FIG. 10 is a block diagram of computing system 1000 providing an application platform according to some embodiments. Computing system 1000 may comprise one or more general-purpose computing apparatuses and may execute program code to perform any of the functions described herein. Computing system 1000 may comprise an implementation of platform 110 in some embodiments. Computing system 1000 may include other unshown elements according to some embodiments.

Computing system 1000 includes processing unit(s) 1010 operatively coupled to communication device 1020, data storage device 1030, one or more input devices 1040, one or more output devices 1050 and memory 1060. Communication device 1020 may facilitate communication with external devices, such as an external network, the cloud, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, and RAM devices, while memory 1060 may comprise a RAM device.

Application server 1031, application 1032, and database synchronization thread 1033 may each comprise program code executed by processing unit(s) 710 to cause server 700 to perform any one or more of the processes described herein. Embodiments are not limited to execution of these processes by a single computing device. Memory store 1034 comprises data created and read during database unavailability as described herein. Data storage device 1034 may also store data and other program code for providing additional functionality and/or which are necessary for operation of computing system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code;
a processing unit to execute the processor-executable program code to cause the system to:
identify a database storage error associated with a database operation requested by an application;
in response to the identification, provide the application with a pointer to a failover framework comprising a memory store;
receive, from the application and at the failover framework, a request to write first data;
in response to the request to write first data, store the first data in a tree structure of the memory store in chronological order;
receive, from the application and at the failover framework, a request to read second data; and
in response to the request to read second data:
sort the tree structure primarily by user and secondarily by chronological order; and
read the second data from the sorted tree structure.

2. A system according to claim 1, wherein data associated with a user is stored in the tree structure as a business object and one or more associated technical objects, the processing unit to execute the processor-executable program code to cause the system to:
determine the database storage error has been resolved; and
in response to the determination that the database storage error has been resolved:
group the data of the tree structure by user and logically link the technical objects of each user; and
merge the grouped and linked data with data of the database storage.

3. A system according to claim 2, wherein storage of the first data in the tree structure of the memory store in chronological order comprises:
logically linking a business object of the first data with a business object of data immediately preceding the first data in the chronological order.

4. A system according to claim 3,
wherein sorting of the tree structure primarily by user and secondarily by chronological order comprises:
grouping business objects of the tree structure by user; and
for each user, sorting the grouped business objects in chronological order and logically linking the sorted and grouped business objects.

5. A system according to claim 1, wherein data associated with a user is stored in the tree structure as a business object and one or more associated technical objects, and
wherein storage of the first data in the tree structure of the memory store in chronological order comprises:
logically linking a business object of the first data with a business object of data immediately preceding the first data in the chronological order.

6. A system according to claim 1, wherein data associated with a user is stored in the tree structure as a business object and one or more associated technical objects, and
wherein sorting of the tree structure primarily by user and secondarily by chronological order comprises:
grouping business objects of the tree structure by user; and
for each user, sorting the grouped business objects in chronological order and logically linking the sorted and grouped business objects.

7. A computer-implemented method comprising:
receiving an exception raised by a database storage system in response to a database operation requested by an application;
in response to the exception, providing the application with a pointer to a failover framework comprising a memory store;
receiving, from the application and at the failover framework, a request to write first data;
in response to the request to write first data, storing the first data in a tree structure of the memory store in chronological order;
receiving, from the application and at the failover framework, a request to read second data; and
in response to the request to read second data:
sorting the tree structure primarily by user and secondarily by chronological order; and
reading the second data from the sorted tree structure.

8. A method according to claim 7, wherein data associated with a user is stored in the tree structure as a business object and one or more associated technical objects, the method further comprising:
determining the database storage error has been resolved; and
in response to the determination that the database storage error has been resolved:
grouping the data of the tree structure by user and logically link the technical objects of each user; and
merging the grouped and linked data with data of the database storage.

9. A method according to claim 8, wherein storing the first data in the tree structure of the memory store in chronological order comprises:
logically linking a business object of the first data with a business object of data immediately preceding the first data in the chronological order.

10. A method according to claim 9,
wherein sorting of the tree structure primarily by user and secondarily by chronological order comprises:
grouping business objects of the tree structure by user; and
for each user, sorting the grouped business objects in chronological order and logically linking the sorted and grouped business objects.

11. A method according to claim 7, wherein data associated with a user is stored in the tree structure as a business object and one or more associated technical objects, and
wherein storing the first data in the tree structure of the memory store in chronological order comprises:
logically linking a business object of the first data with a business object of data immediately preceding the first data in the chronological order.

12. A method according to claim 7, wherein data associated with a user is stored in the tree structure as a business object and one or more associated technical objects, and
wherein sorting of the tree structure primarily by user and secondarily by chronological order comprises:
grouping business objects of the tree structure by user; and
for each user, sorting the grouped business objects in chronological order and logically linking the sorted and grouped business objects.

13. A computer-readable medium storing processor-executable program code, the program code executable to cause a computing system to:
provide a failover framework, the failover framework to:
identify a database storage error associated with a database operation requested by an application;
in response to the identification, provide the application with a pointer to the failover framework;
receive, from the application, a request to write first data;
in response to the request to write first data, store the first data in a tree structure of a memory store in chronological order;
receive, from the application, a request to read second data; and
in response to the request to read second data:
sort the tree structure primarily by user and secondarily by chronological order; and
read the second data from the sorted tree structure.

14. A medium according to claim 13, wherein data associated with a user is stored in the tree structure as a business object and one or more associated technical objects, the failover framework to:
determine the database storage error has been resolved; and
in response to the determination that the database storage error has been resolved:
group the data of the tree structure by user and logically link the technical objects of each user; and
merge the grouped and linked data with data of the database storage.

15. A medium according to claim 14, wherein storage of the first data in the tree structure of the memory store in chronological order comprises:
logically linking a business object of the first data with a business object of data immediately preceding the first data in the chronological order.

16. A medium according to claim 15,
wherein sorting of the tree structure primarily by user and secondarily by chronological order comprises:
grouping business objects of the tree structure by user; and
for each user, sorting the grouped business objects in chronological order and logically linking the sorted and grouped business objects.

17. A medium according to claim 13, wherein data associated with a user is stored in the tree structure as a business object and one or more associated technical objects, and
wherein storage of the first data in the tree structure of the memory store in chronological order comprises:
logically linking a business object of the first data with a business object of data immediately preceding the first data in the chronological order.

18. A medium according to claim 13, wherein data associated with a user is stored in the tree structure as a business object and one or more associated technical objects, and
wherein sorting of the tree structure primarily by user and secondarily by chronological order comprises:
grouping business objects of the tree structure by user; and
for each user, sorting the grouped business objects in chronological order and logically linking the sorted and grouped business objects.

\* \* \* \* \*